United States Patent [19]

Thompson et al.

[11] Patent Number: 5,247,664
[45] Date of Patent: Sep. 21, 1993

[54] FAULT-TOLERANT DISTRIBUTED DATABASE SYSTEM AND METHOD FOR THE MANAGEMENT OF CORRECTABLE SUBTRANSACTION FAULTS BY THE GLOBAL TRANSACTION SOURCE NODE

[75] Inventors: Glenn R. Thompson, Tulsa; Wen F. Lee, Bixby; Peter L. Olson, Jenks; Tom C. Reyes, Tulsa; George F. Thomas, III, Tulsa; Bing Vassaur, Tulsa, all of Okla.

[73] Assignee: Amoco Corporation, Chicago, Ill.

[21] Appl. No.: 676,605

[22] Filed: Mar. 28, 1991

[51] Int. Cl.$^5$ .................. G06F 15/40; G06F 15/403
[52] U.S. Cl. .................. 395/600; 395/575; 395/650; 364/DIG. 1; 364/282.1; 364/282.4; 364/284; 364/284.3; 364/285.3; 364/286; 371/12
[58] Field of Search .............. 395/650, 700, 425, 575, 395/600; 364/200; 370/58.1; 371/12

[56] References Cited

U.S. PATENT DOCUMENTS

| | | | |
|---|---|---|---|
| 4,627,019 | 12/1986 | Ng | 364/900 |
| 4,847,830 | 7/1989 | Momirov | 370/58.1 |
| 4,887,204 | 12/1989 | Johnson et al. | 364/200 |
| 4,914,570 | 4/1990 | Peacock | 364/200 |
| 4,925,311 | 5/1990 | Neches et al. | 364/200 |
| 5,046,002 | 9/1991 | Takashi et al. | 395/600 |
| 5,065,311 | 11/1991 | Masai et al. | 395/575 |

*Primary Examiner*—Thomas C. Lee
*Assistant Examiner*—Wayne Amsbury
*Attorney, Agent, or Firm*—James A. Gabala; Richard A. Kretchmer; Frank J. Sroka

[57] ABSTRACT

A fault-tolerant method and system for processing global transactions in a distributed database system. If a fault occurs in the distributed database system, a transaction management system will suspend the processing of a transaction and renew it when the fault is remedied. The transaction management system identifies one or more sites in the distributed database system that contain data needed for a global transaction and divides each transaction into subtransactions for processing at one or more identified sites. If a fault occurs in the distributed database system, the transaction management system maintains the status of each subtransaction. When a fault in the distributed database system is corrected, the transaction management system updates the status of each subtransaction and restarts processing of the transactions.

14 Claims, 11 Drawing Sheets

FAULT-TOLERANT DISTRIBUTED DATABASE SYSTEM AND METHOD FOR THE MANAGEMENT OF CORRECTABLE SUBTRANSACTION FAULTS BY THE GLOBAL TRANSACTION SOURCE NODE

BACKGROUND OF THE INVENTION

The present invention relates generally to a fault-tolerant method and system for processing global transactions in a distributed database system. In particular, a transaction management method and system are provided that renews processing of global transactions interrupted by a fault in the distributed database system after the fault has been remedied.

A distributed database system provides a user with a uniform method for accessing one or more homogeneous or heterogeneous database management systems that can be located at different computing sites or at one computing site. Typically, such distributed database systems include a centralized database management system for accessing the various local database management systems. In using a distributed database system, the user is not required to know the location or the characteristics of the data needed for a particular transaction when using a global data model and global transaction language. Universality of access to distributed database systems is a feature of Amoco Production Company's distributed database system (ADDS), as described in "ADDS—Heterogeneous Distributed Database System" by Y. J. Breitbart and L. R. Tieman, *Distributed Data Sharing Systems*, North-Holland Publ. 1985. Data update concurrency control in ADDS is described in U.S. Pat. No. 4,881,166 which is incorporated by reference herein.

In current distributed database systems, including ADDS, if a fault occurs in the distributed database system, such as a communication network failure or equipment inoperability or unavailability, the processing of all transactions affected by the fault ceases, all data updated as a result of the transactions are returned to their original status, and the user is provided with an abort message. The cessation of update transactions is needed to ensure the integrity of all data affected by the update transactions. However, in some applications, it is necessary to perform the database operations in a transaction until the operations complete successfully. For example, it is very costly to abort transactions that retrieve large amounts of data. Moreover, a fault anywhere in the centralized database management systems causes all transactions to cease regardless of the states of the various distributed database management subsystems. Such centralized database management systems provide the user with neither an indication of the availability of resources in the distributed database system nor a suspended or recovery status of global transactions. Moreover, the user is provided with no method for intervention in a transaction. The centralized database management system provides no method for dynamic site switching for locating data for a particular transaction.

There is a need for a distributed database system that is fault-tolerant to overcome the foregoing deficiencies as well as meet the above described needs.

SUMMARY OF THE INVENTION

The present invention provides a fault-tolerant method and system for processing global transactions in a distributed database system. If a fault occurs in the distributed database system, a transaction management system interrupts processing of the transaction at affected sites in the distributed database system, maintains processing at nonaffected sites and renews processing of the interrupted transaction when the fault is remedied without aborting the transaction, i.e., the transaction processing is fault-tolerant.

In the method of the present invention, upon receipt of a transaction, the transaction management system identifies one or more sites in the distributed database system that contain data needed for the global transaction. The global transaction is divided into subtransactions for processing at the identified one or more sites. If a system fault is detected in the distributed database system, the status of each subtransaction is maintained until the fault is corrected, whereupon the status of each subtransaction is updated. Thereafter, the processing of the subtransactions at the one or more identified sites is continued to retrieve or update the identified data.

DETAILED DESCRIPTION OF THE PREFERRED EMBODIMENTS

In order to better understand the present invention, the following introductory discussion is provided. A distributed database system comprises several databases that are managed by local database management systems (LDMS$_i$) as well as a centralized database management system (CDMS) for providing a user uniform access to each of the various databases. As used in the art, the term "distributed" means the local database management systems can be at different locations.

Figure 1:
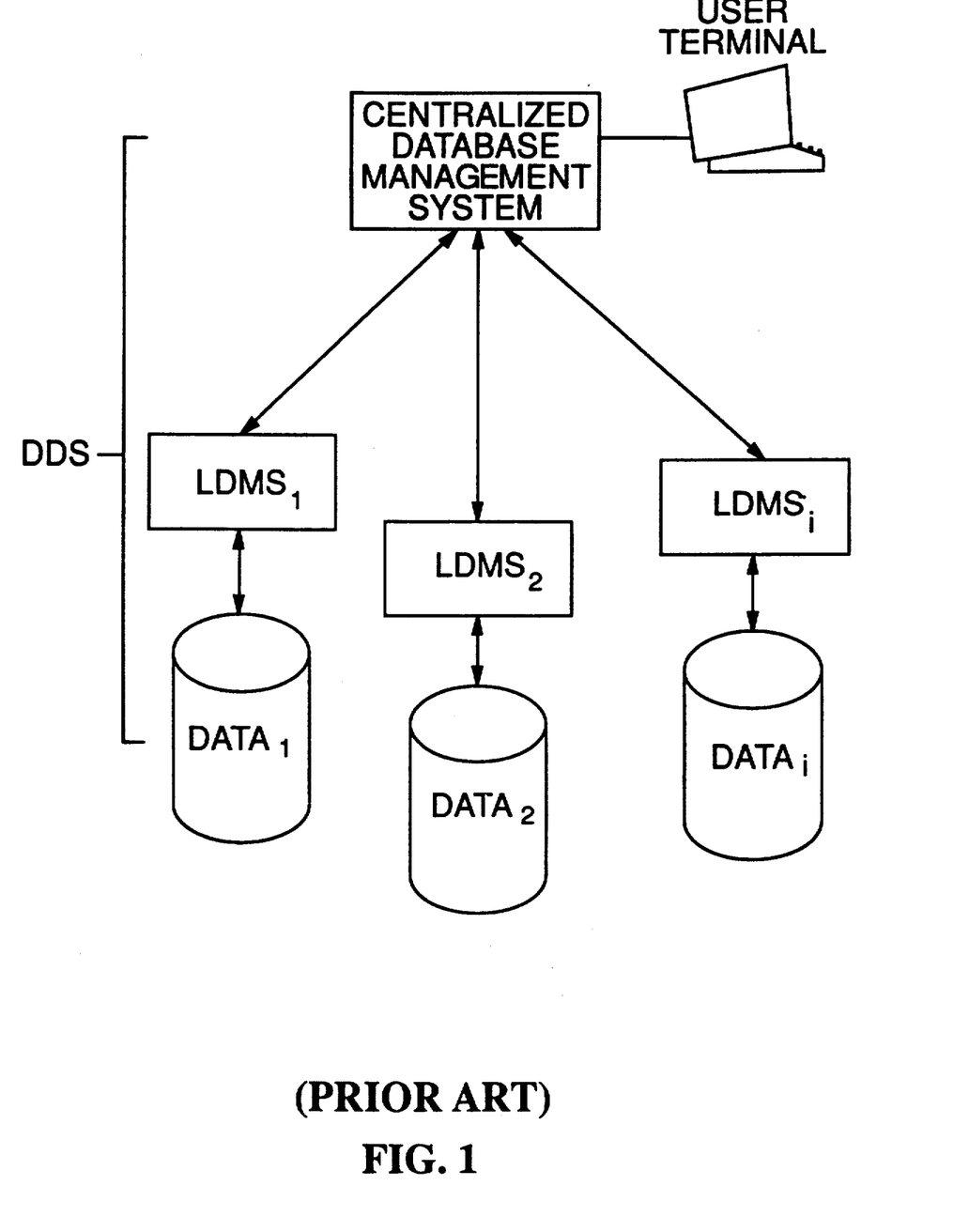
FIG. 1 is a schematic diagram of a typical distributed database system.

Distributed database systems (DDS) are generally of the form depicted in FIG. 1. Here a user, through an interactive device such as a terminal, accesses the DDS through a centralized database management system (CDMS). Typically, a user will access the CDMS in search of information in the various distributed databases $D_i$. Such access to the CDMS is generally referred to as a query or read transaction since the user is asking to read certain parts of the underlying databases $D_i$ to locate information related to a user defined transaction. Alternatively, a user will access the CDMS to change data in various of the underlying databases. Such access to the CDMS is typically referred to as an update or write transaction since the user is trying to update information by writing corrected information into the appropriate databases. Unless otherwise noted, use of the term transaction will be understood to include both query and update transactions. Such transactions are considered global when they require access to more than one of the underlying databases.

Although not depicted in FIG. 1, the CDMS comprises a central processing unit (CPU) having one or more compilers as well as servers controlling access to a LDMS$_i$ and its underlying database D$_i$. In operation, the CDMS allows the user to access multiple pre-existing databases D$_i$ in a single transaction using global transaction language. Therefore, the user is not required to know the intricacies of each LDMS$_i$.

In current distributed database systems, including ADDS, if a fault in the distributed database system occurs, such as a communication network failure or equipment inoperability or unavailability, the processing of all transactions affected by the fault ceases, all data updated as a result of the transactions are returned to their original status, and the user is provided with an abort message. The cessation of update transactions is needed to ensure the integrity of all data affected by the update transactions. However, in some applications, it is necessary to perform the database operations in a transaction until the operations complete successfully. For example, it is very costly to abort transactions that retrieve large amounts of data. Moreover, DDS as depicted by FIG. 1 are vulnerable to a single point failure in the CDMS causing the processing of all transactions to cease.

The present invention comprises a fault-tolerant transaction management system (TMS) for use in a distributed database system (DDS), which can be either homogeneous or heterogeneous. Unlike the centralized database management systems, each node site in the distributed database system has its own local transaction management system (TMS). The TMS identifies one or more sites in the DDS that contain data needed for a particular transaction (either query or update). The transaction is divided into subtransactions for processing at the identified one or more sites. Upon detection of a fault in the DDS, the status of each subtransaction is maintained by the TMS. Upon correction or remedy of the fault, the TMS revises the status of each subtransaction and renews processing of the subtransactions at the identified one or more sites to retrieve queried data or to update selected data. Most significantly, the TMS does not abort partially completed transactions; but rather, the TMS maintains the status of the transactions up to the moment of interrupt and when the fault condition has been corrected automatically renews processing of the transaction.

Figure 2:
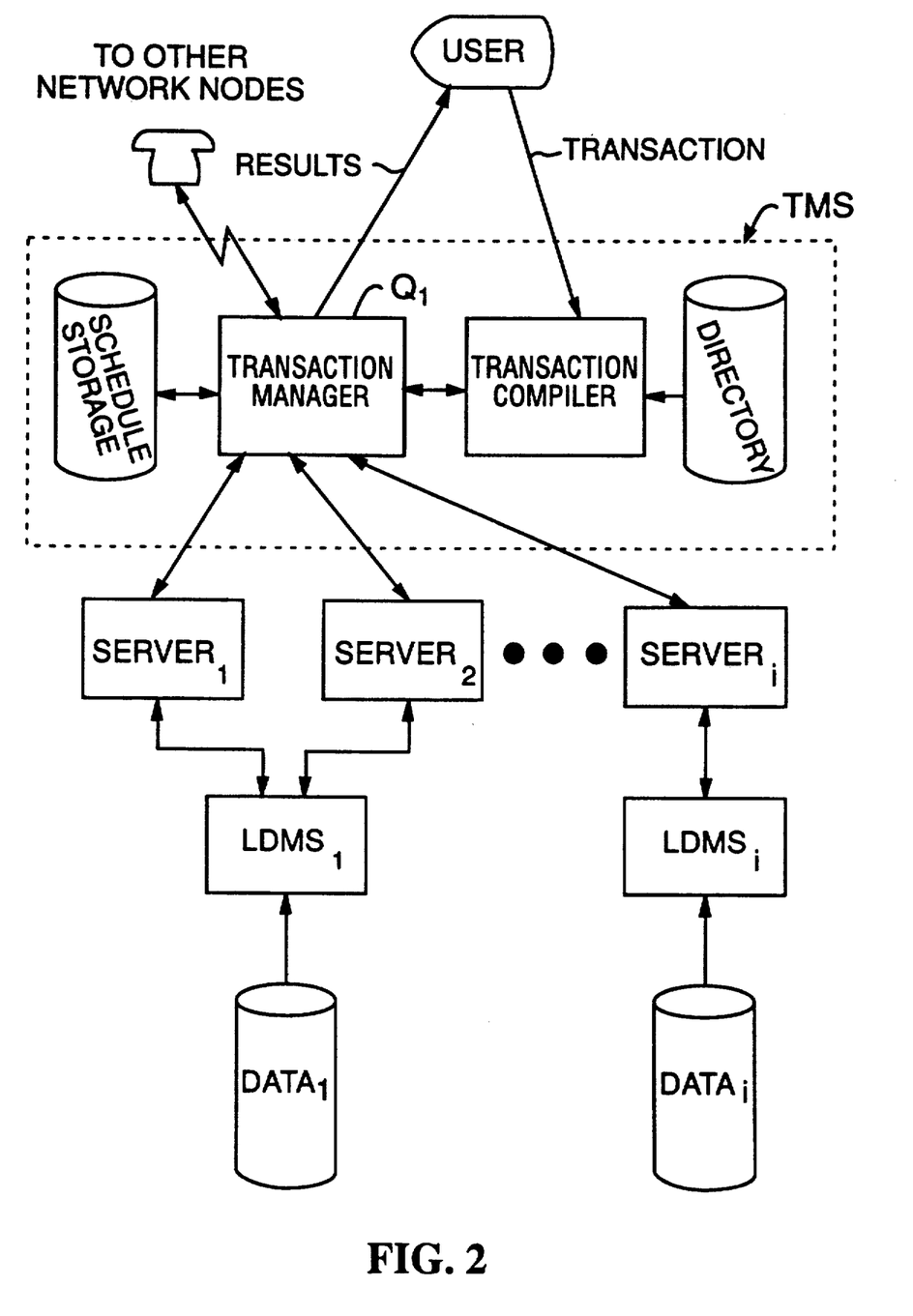
FIG. 2 is a schematic diagram of a fault-tolerant transaction management system at a single network node in a distributed database system.

Looking now to FIG. 2, the present invention is described in more detail. In particular, FIG. 2 represents a transaction management system (TMS) at a single network node or site in a DDS, such as for VM, OS/2, DOS and the like. The TMS contains a transaction compiler, as well as a directory and plurality of servers S$_i$ controlling access to databases D$_i$ through their LDMS$_i$. Additionally, a transaction manager Q provides control of user initiated transactions in accordance with the present invention. Moreover, a TMS and its transaction manager Q$_i$ are located at each node or site in the DDS to manage the scheduling and processing of global transactions at each local site in the DDS.

During transaction processing any one or more of the following failures may occur. A failure of a local LDMS$_i$ can prevent the processing of global transactions. This type of failure can be detected by its server S$_i$ and reported to its local transaction manager Q$_1$. A failure of a server S$_i$ can prevent it from executing transactions and responding to messages from its transaction manager Q$_1$ and from the LDMS$_i$. A failure of the local transaction manager Q$_1$ can prevent the submission of global transactions from the local site and can prevent the scheduling of transactions for local execution. A communication network failure prevents two or more transaction managers Q$_i$ at different locations from exchanging messages. A processor failure can result in the failure of one or more of the system components listed above. These types of failures are examples of what will hereinafter be referred to as an unavailability of resources to the DDS.

All of these failures are assumed to be detectable by the TMS and the present invention undertakes corrective actions to recover from failures and to complete transaction processing. When a transaction fails or is suspended, the transaction manager Q$_1$ executes the transaction after the conditions that caused the failure or suspension are corrected, either automatically by the system or manually by the system operator, causing resources to become unavailable. As we shall see below, the TMS provides a fault-tolerant distributed database system and one not generally subject to the single-point failure. The TMS of the present invention can provide a user with an indication of the availability of resources in the DDS as well as a status of suspended or recovering transactions. The TMS also provides for user intervention in resource and transaction recovery. Additionally, the TMS provides for dynamic site switching for locating data for a particular transaction.

To provide a more detailed understanding of the transaction management system components and operation, the following discussion is divided into three portions: transaction compiler, transaction manager, and server.

I. TRANSACTION COMPILER

Figure 3:
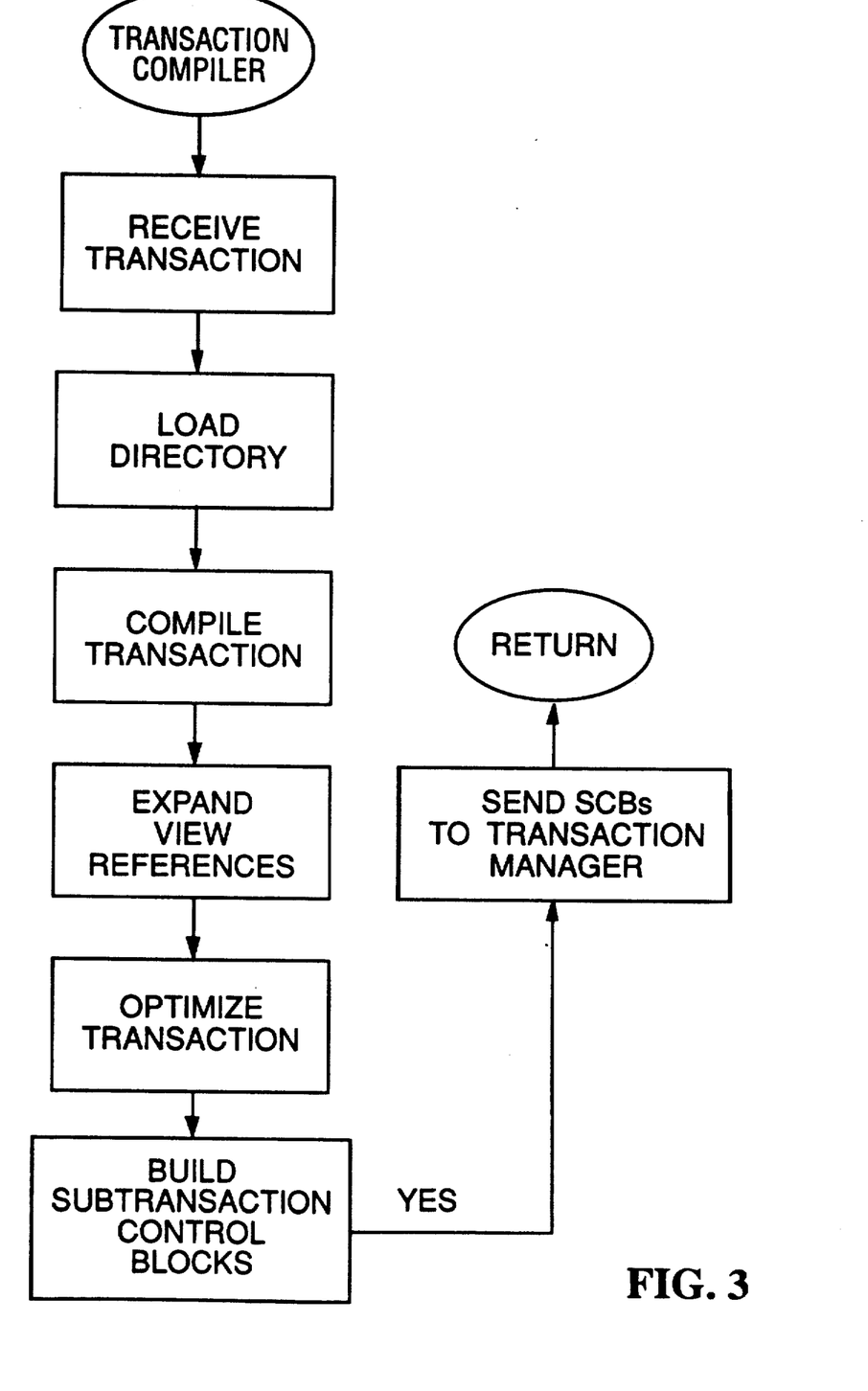
FIG. 3 are schematic flow diagrams depicting the operations of the transaction compiler.

Looking now to FIG. 3, the operation of the transaction compiler of FIG. 2, at a particular site or node is described more completely. A transaction compiler process is active at each site in the DDS. Upon receiving a global transaction from a local user, the transaction compiler verifies that the user is authorized to access the specified database items and loads directory information needed to compile the transaction. The directory contains information such as the description and location of the database items, as well as the list of users authorized to access the items. The transaction compiler then compiles the global transaction, performs semantic checking and translates the global transaction into a schedule of database operations. If a syntax or semantic error is detected, the transaction compiler sends an appropriate diagnostic message to the user who submitted the global transaction. The transaction compiler also replaces and expands any view references in the transaction. If transaction compilation is successful, the global transaction is optimized for minimal data transmission across the communications network.

The compiler also creates subtransactions from the submitted global transaction which are to be executed at various LDMS$_i$ throughout the DDS. Subtransaction control blocks (SCB's) are generated from the optimized transactions The subtransactions and their associated SCB's are then sent to their respective local transaction managers, Q$_i$ for execution. The SCB's contain information such as the identification (i.e., USER ID or user identifier) of the user submitting the transaction the date and time of transaction submission, a unique transaction identifier, the execution location for each subtransaction of the transaction, a non-prime time indicator, a subtransaction state indicator, and the database operations that comprise the transaction. The transaction compiler then returns to process the next global transaction.

II. TRANSACTION MANAGER

Looking to FIGS. 4a-f, schematic diagrams are provided for the operation of a local transaction manager $Q_1$. The transaction managers $Q_i$ are active at each site in the DDS network. The local transaction manager $Q_1$ communicates with the other processes that are active at the local site (e.g., transaction compiler and servers $S_i$), and also communicates with remote transaction managers $Q_i$ at other sites in the DDS via a communications network. The primary responsibility of each transaction manager $Q_i$ is to manage the scheduling and processing of each subtransaction from the list of local SCB's. To accomplish these tasks, the local transaction manager $Q_1$ receives subtransactions from the local transaction compiler or from a remote transaction managers $Q_i$ at other locations in the DDS and schedules the execution of subtransactions. A subtransaction may complete successfully, fail, require rescheduling, or be suspended. Subtransaction state transitions are controlled by the transaction managers $Q_i$. The local transaction manager $Q_1$ monitors and records the state of each local subtransaction ensuring that recovery and restart are possible. Upon request from the user, the local transaction manager Q also determines the global transaction state by inspecting the state of each subtransaction throughout the DDS that comprises the global transaction.

Figure 4A:
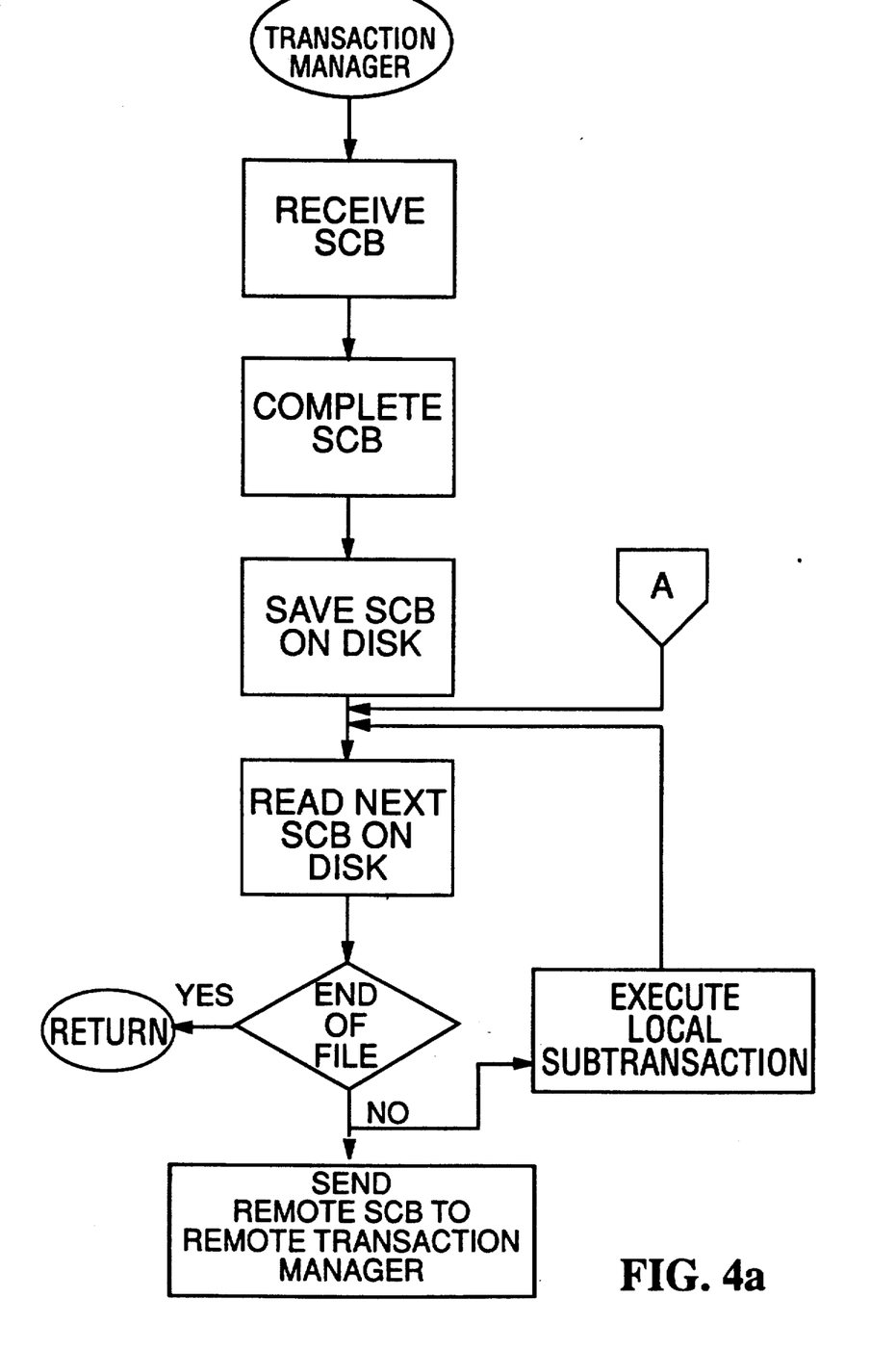
FIGS. 4a, b, c, d, e and f are schematic flow diagrams depicting the operations of the transaction manager.

In particular and looking first to FIG. 4a, the local transaction manager $Q_1$ initially receives SCB's for a global transaction from the local transaction compiler or from a transaction manager $Q_i$ at another location. The local transaction manager $Q_1$ completes the construction of the SCB for the global transaction and sets the state of the appropriate subtransactions to READY and the local transaction manager $Q_1$ saves the SCB to a SCB file in stable storage. The local transaction manager $Q_1$ scans the SCB file and selects subtransactions for execution and reads the next record in the SCB file to be executed. If the current SCB is to execute at a remote location, the local transaction manager $Q_1$ sends the SCB's to the remote location transaction manager $Q_i$ for execution. If the SCB is ready for execution at the local site and a server Si is available to execute the transaction, the local subtransaction manager $Q_1$ allocates a server $S_i$ to the subtransaction and sends the SCB to the server $S_i$ for execution. If the data is unavailable at one site in the DDS, the local transaction manager $Q_1$ can redirect the execution of a substraction to another site that contains the needed data.

Figure 4B:
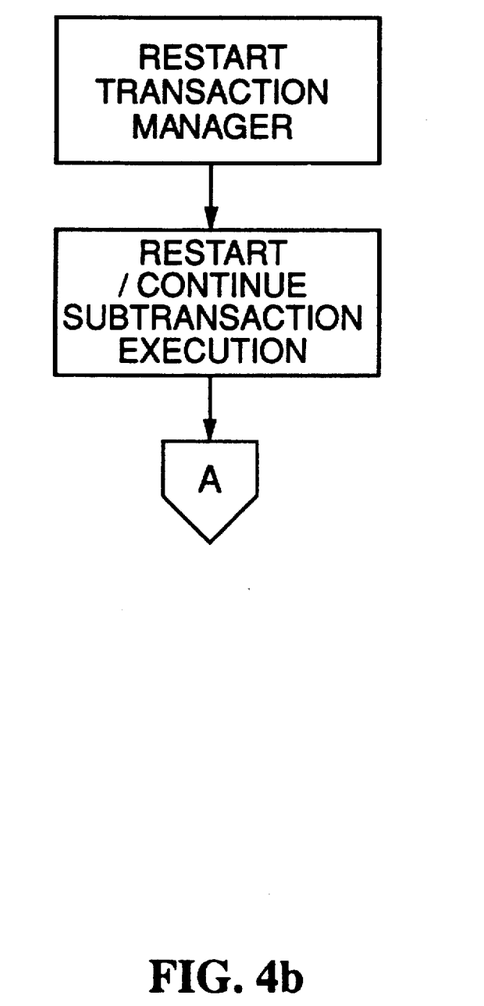

In the event that any transaction manager $Q_i$ fails and later returns to operation, the local servers $S_i$ that did not also fail are allowed to complete the execution of the associated subtransactions. For those servers $S_i$ that failed, the execution of the associated subtransactions is restarted by the local transaction manager $Q_1$ and the restart of the local transaction manager $Q_1$ is depicted in FIG. 4b. In particular, upon restarting the transaction manager $Q_1$, the transaction manager $Q_1$ restarts or continues the execution of all local subtransactions that were active when the transaction manager $Q_1$ failed.

Figure 4C:
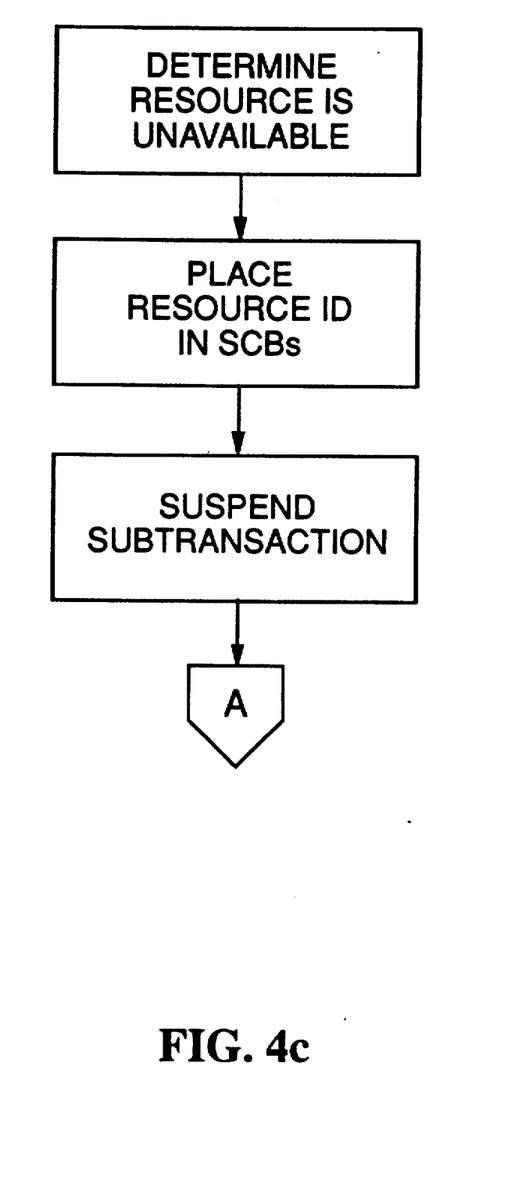
Figure 4D:
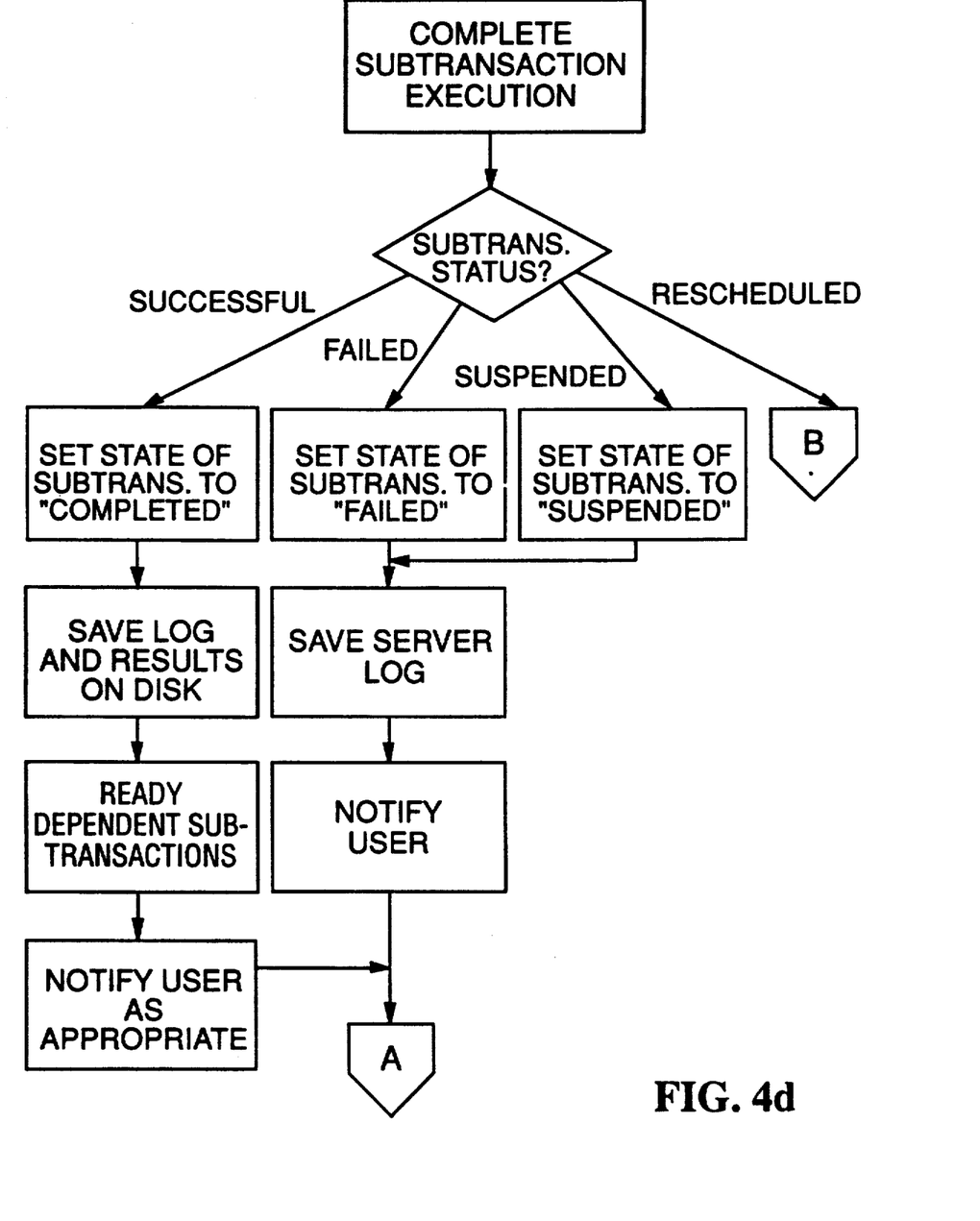

While attempting to communicate with a transaction manager $Q_i$ at another location for a specific subtransaction, for example, the local transaction manager $Q_1$ may determine that the communication link or the remote transaction manager $Q_i$ is unavailable in FIG. 4c. In this case, an appropriate resource identifier (i.e., link or transaction manager) is placed into the resource field of all SCB's for the subtransactions that require the resource. The state of the corresponding subtransactions is set to SUSPENDED and the operation of the local transaction manager $Q_1$ returns to block A of FIG. 4a to process the next SCB.

Recall that the local transaction manager $Q_1$ assigns SCB's to available servers $S_i$ for execution and the servers $S_i$ then attempt to execute the subtransaction assigned to them. Looking now to FIG. 4d, a subtransaction may complete successfully, fail if certain information is wrong, require rescheduling, or be suspended. Upon completion of subtransaction execution by a server $S_i$, the local transaction manager $Q_1$ assigns a subtransaction status. If the subtransaction completes successfully, the local transaction manager $Q_1$ sets the state of the subtransaction to COMPLETED, and saves the server log and the results of the subtransaction in stable storage. The local transaction manager $Q_1$ then sets the state of the subtransactions that are dependent upon the completion of the current subtransaction to READY, unless the subtransactions are also waiting on the completion of other subtransactions associated with the global transaction. If the subtransaction represents the final step in the execution of the global transaction, the user is notified of the successful completion of the global transaction and returns to block A of FIG. 4a.

If the subtransaction fails to complete successfully, the local transaction manager $Q_1$ sets the state of the subtransaction to FAILED, saves the server log in stable storage for review by the user, and notifies the user that the global transaction has failed to complete successfully and returns to block A of FIG. 4a.

Figure 4E:
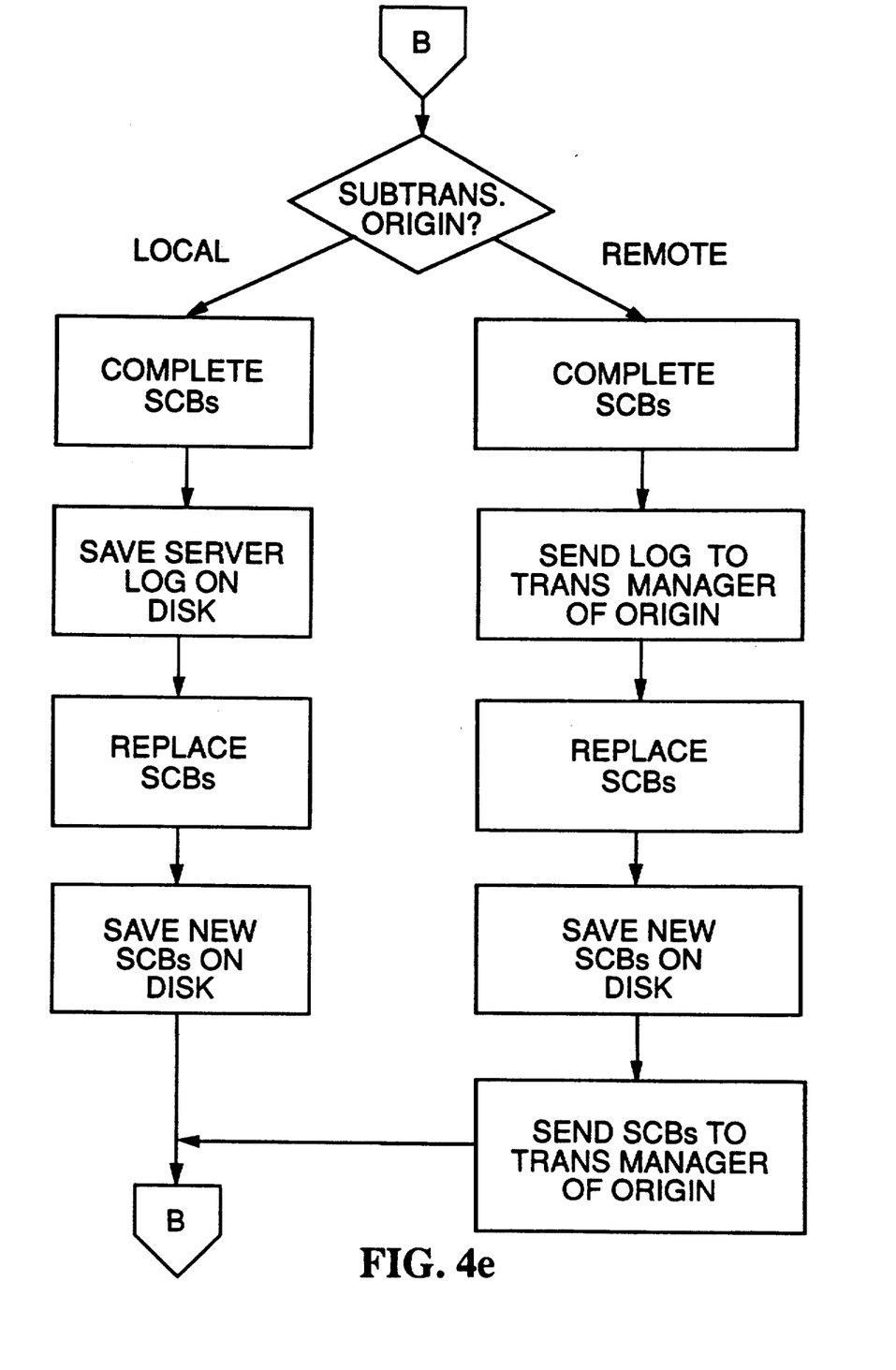

If the subtransaction is rescheduled by the server $S_i$, a set of new SCB's for the rescheduled subtransaction are constructed and stored in stable storage at block B of FIG. 4e. Looking now to FIG. 4e, if the subtransaction was submitted at the local site, the local transaction manager $Q_1$ saves the associated server log in stable storage, replaces the old SCB's for the subtransaction with the set of new SCB's and sets the state of the appropriate new SCB's to READY. If the subtransaction was submitted from another location, the local transaction manager $Q_1$ sends the server log to the transaction manager $Q_i$ at the location of transaction submission, replaces the old SCB's for the subtransaction with a set of new SCB's, and sets the state of the appropriate new SCB's to READY. The local transaction manager $Q_1$ then sends the set of new SCB's to the transaction manager $Q_i$ at the location of transaction submission for recording.

If the subtransaction is suspended by the server $S_i$ due to an unavailable resource or the occurrence of an event, the local transaction manager $Q_1$ sets the state of the subtransaction to SUSPENDED and saves the server log in stable storage for review by the user. The transaction manager $Q_1$ then notifies the user that the global transaction is suspended waiting on a resource or event. Once a server $S_i$ notifies its local transaction manager $Q_1$ of the completion status of a subtransaction, the server $S_i$ is then available for reassignment to another subtransaction.

Occasionally, unexpected or unknown errors occur causing a transaction to fail. Upon failure of a transaction, all intermediate results of the transaction are saved in stable storage. These cases normally require user intervention to determine the cause of the problem. Looking now to FIG. 4f, once the problem is isolated and resolved, the user may request that the local transaction manager $Q_1$ restart the transaction from the point of failure, cancel the transaction, delete the transaction from the system or ready a transaction for renewed processing.

Figure 4F:
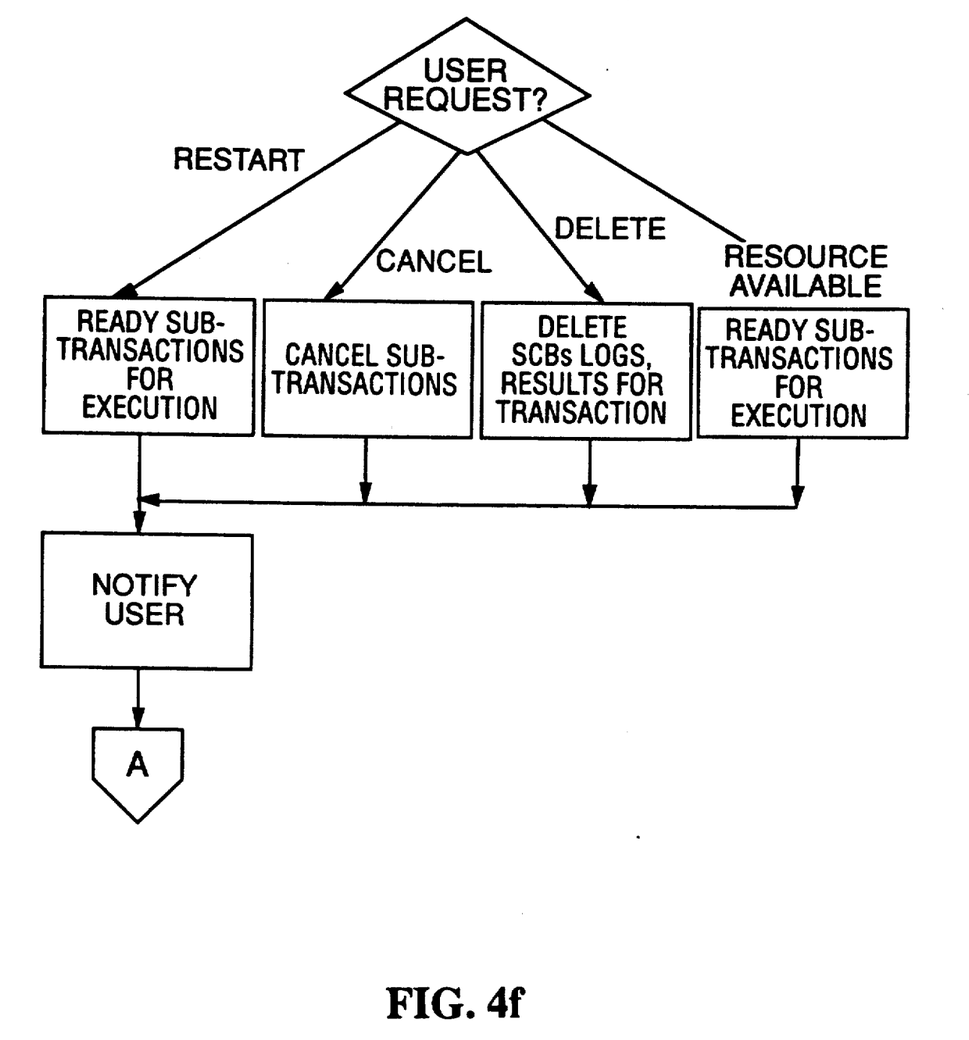

Upon receiving a request from the user to restart a global transaction that previously failed to complete successfully, the local transaction manager $Q_1$ changes the state of the failed subtransactions of the global transaction to READY at all sites and notifies the user that the global transaction has been restarted. A user may decide that he does not want a global transaction to complete execution. In this case, the user requests that the local transaction manager $Q_1$ cancel the execution of the global transaction. The transaction manager $Q_1$ sets the state of the uncompleted subtransactions to CANCELLED at all sites and notifies the user that the global transaction has been cancelled.

After a user is finished processing the results of a transaction, the user may request that the local transaction manager $Q_1$ delete the global transaction from the system. Upon receiving a request from the user to delete a global transaction, the transaction manager $Q_1$ deletes all associated SCB's, server logs, and subtransaction results. The transaction manager $Q_1$ then notifies the user that the global transaction has been deleted. Upon receiving notification from a user that a resource is now available or that an event has occurred, the local transaction manager $Q_1$ reads the local SCB's file and changes the state of all subtransactions waiting on the specified resource or event to READY unless the subtransactions are also waiting on additional resources. The user is then notified that the subtransactions that were waiting on the specified resource or event have been activated.

III. SERVER

Looking now to FIGS. 5a and 5b, the operation of the server $S_i$ will be described. The server $S_i$ is a process that waits for work from the local transaction manager $Q_1$. Any number of server processes can be activated at a site to process subtransactions. The local transaction manager $Q_1$ determines that a subtransaction is ready for execution, that a server $S_i$ is available for work, identifies the software program that is required to perform the tasks identified in the subtransaction, and causes the program to load and execute in the server $S_i$.

If a server $S_i$ determines that a subtransaction contains operations that the server $S_i$ is unable to perform, the subtransaction is rescheduled by the server $S_i$. Rescheduling means that the subtransaction is subdivided into a set of new subtransactions (and operations) that the server $S_i$ is able to execute. If a database $D_i$ or other resource is unavailable and the server $S_i$ is unable to complete the execution of a subtransaction, the server $S_i$ causes the subtransaction to be suspended from further execution until the resource is available. The server $S_i$ performs the work necessary to complete the execution of a subtransaction, notifies the local transaction manager $Q_1$ of the completion status, cleans and resets its environment, and waits for additional work from the transaction manager.

Figure 5A:
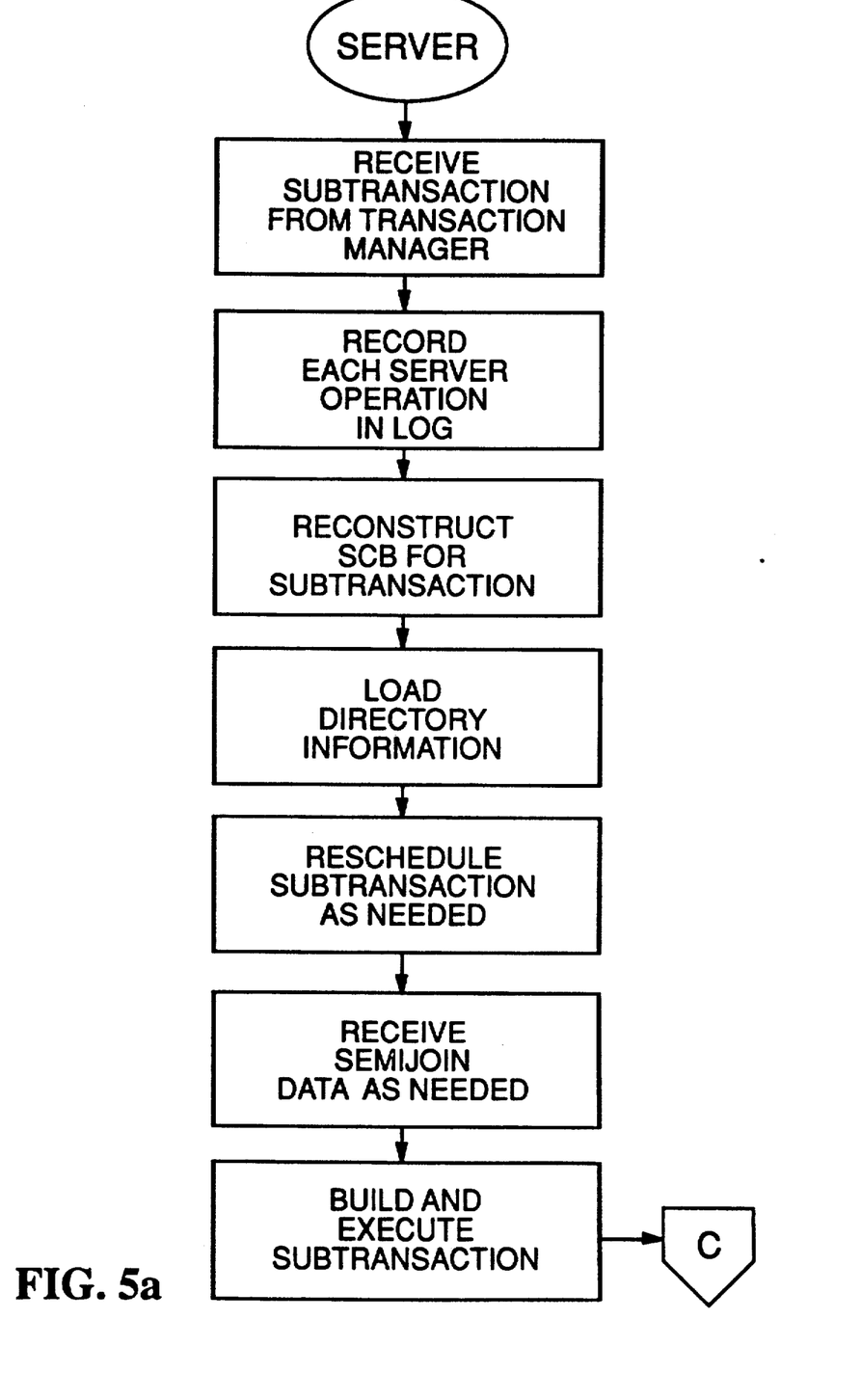
FIGS. 5a and b are schematic flow diagrams depicting the operations of the servers.

Looking now to FIG. 5a, upon receiving SCB's from the local transaction manager $Q_1$ for execution, the server $S_i$ records the results of each step of the subtransaction execution in the server log file in stable storage; loads the transaction tree from the SCB's into primary storage; loads the directory information needed to execute the subtransaction into primary storage. If the subtransaction contains operations that the server $S_i$ is unable to perform, the server $S_i$ reschedules the subtransaction and reconstructs the old subtransaction into a set of new subtransactions and SCB's, isolating the operations that the server is unable to perform. The server $S_i$ then sends the new SCB's and the server log to the local transaction manager $Q_1$ indicating that the subtransaction is to be rescheduled. If the subtransaction involves a semijoin, the server $S_i$ requests and receives the semijoin data from the transaction manager $Q_1$ and then builds the subtransaction, with semijoin data if available, and executes the subtransaction.

Figure 5B:
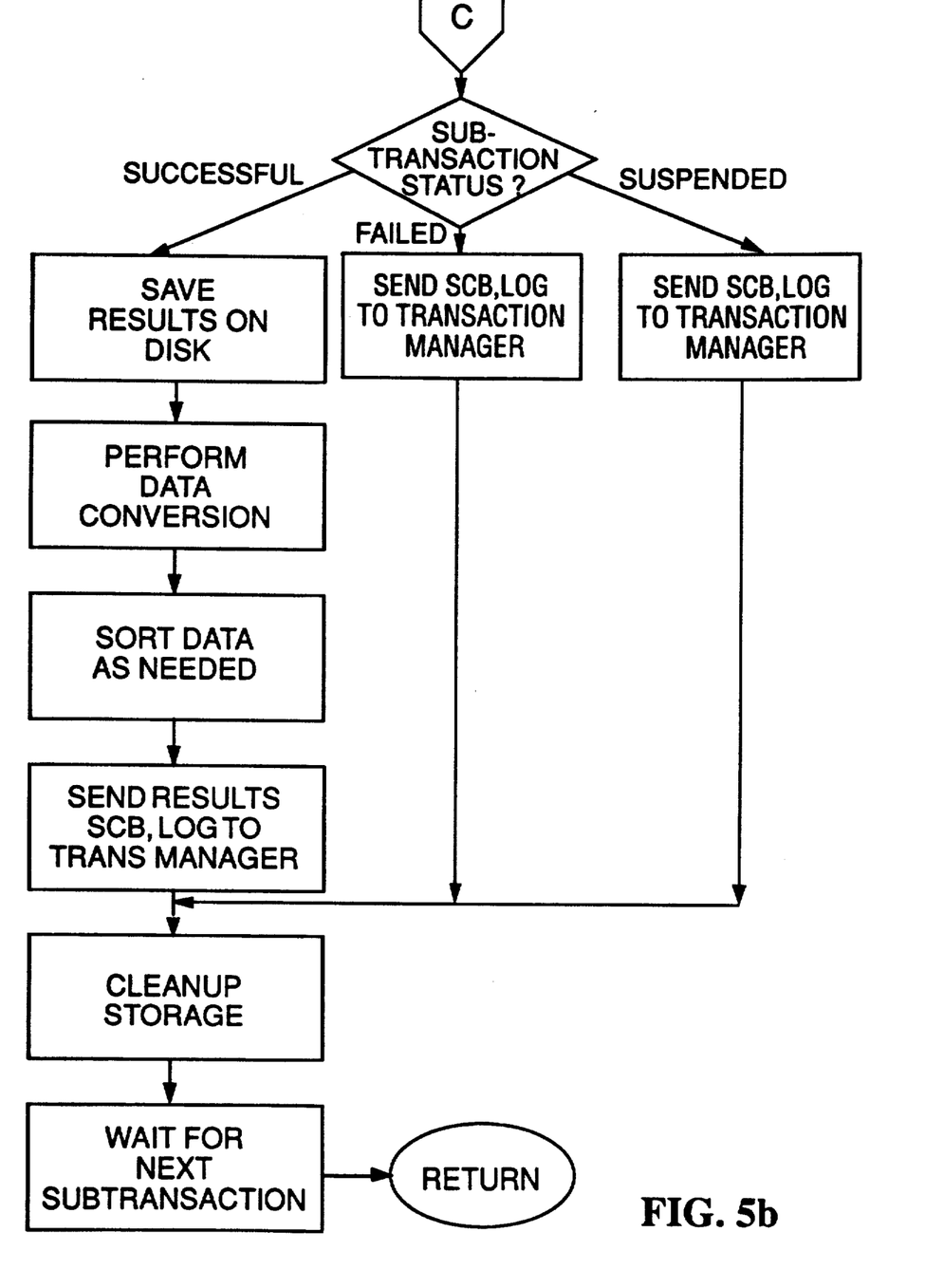

Looking now to FIG. 5b, if the subtransaction completes successfully, the server $S_i$ records the results of the subtransaction into a file in stable storage; performs any necessary data conversion on the retrieved data in the file; sorts the results and eliminates duplicate data in the retrieved data, as appropriate; and sends the retrieved data, the schema of the retrieved data, the SCB's, and the Server log to the local transaction manager $Q_1$ indicating that the subtransaction completed successfully. If the subtransaction fails to complete successfully, the server $S_i$ sends the SCB's and the server log to the local transaction manager $Q_1$ indicating that the subtransaction failed to complete successfully; upon determining that a necessary resource is unavailable, suspends execution of the subtransaction, places the resource identifier into the resource field of the SCB's for the subtransaction, sends the SCB's and server log to the local transaction manager $Q_1$ indicating that the subtransaction is suspended waiting on the specified resource, and releases all primary and secondary (stable) storage associated with the execution of the current subtransaction, and waits for the next subtransaction from the local transaction manager $Q_1$.

A fault-tolerant transaction management system for processing global transactions in a distributed database system has been described. The advantages of the present invention will now be apparent to those skilled in the art. Moreover, it will also be apparent that variations and modifications thereto can be made without departing from the scope of the invention as set forth in the claims below.

We claim:

1. A fault-tolerant method of processing a global transaction in a distributed database system having a plurality of sites and affected by faults that prevent the processing of subtransactions and that are correctable, comprising:
 (a) upon receipt of a global transaction at one of the sites in the distributed database system, identifying a number of sites among the plurality of sites in the distributed database system that contain data needed for the global transaction;
 (b) dividing the global transaction by the said one site into subtransactions for processing at the identified sites and communicating the subtransactions to each appropriate identified site for processing;
 (c)(1) monitoring at said one site the processing of all the subtransactions,
 (c)(2) detecting at said one site a fault in the distributed database system that prevents the processing of a subset of the subtransactions and continuing the processing of the unaffected subtransactions, (c)(3) interrupting by said one site the processing of the affected subset of subtransactions, (c)(4) maintaining by said one site a status of all the subtransactions, and (c)(5) correcting said fault;

(d) upon correction of the fault, updating the status by said one site of each subtransaction affected by the fault; and (e)(1) restarting by said one site the processing of the affected subtransactions at the identified sites, and (e)2) continuing the processing of the unaffected subtransactions.

2. The method of claim 1, wherein the distributed database system is a heterogeneous distributed database system.

3. The method of claim 1, wherein maintaining the status of each subtransaction further comprises sending the last executed portion of each subtransaction to stable storage at the local site.

4. The method of claim 3, further including presenting to a user an indication of the status of a subtransaction selected from the group including: failed, suspended, completed and rescheduled.

5. The method of claim 3, wherein updating the status of each subtransaction comprises retrieving from stable storage previously executed portions of each subtransaction at the local site or other sites in the distributed database system.

6. The method of claim 5, further including presenting to a user an indication that the global transaction has recommenced processing after suspension.

7. The method of claim 1, wherein processing the subtransactions at the identified one or more sites further comprises:

(a) allocating a server at each site for each identified subtransactions;

(b) sending the subtransaction to each identified site;

(c) executing the subtransaction to perform an operation by each of the servers;

(d) rescheduling selected operations to be performed at selected sites;

(e) merging data from local servers and servers at other sites; and (f) representing the merged data to a user at said one site.

8. A fault-tolerant transaction management system in a distributed database system that has a plurality of processing sites and that is affected by correctable faults, comprising:

(a) means for submitting a global transaction at a first one of the sites in the distributed database system;

(b) means for identifying a number of sites among the plurality of sites in the distributed database system that contain data needed for the global transaction;

(c) means for dividing the global transaction by the said one site into subtransactions for processing at the identified sites and for distributing each of said subtransactions to each of said identified sites;

(d)(1) monitoring means at said first site for monitoring the processing of all the subtransactions, (d)(2) means for detecting at said one site a fault in the distributed database system that prevents the processing of a subset of the subtransactions and continuing the processing of the unaffected subtransactions, (d)(3) means for interrupting by said one site the processing of the affected subset of subtransactions, (d)(4) means for maintaining by said one site a status of all the subtransactions, and (d)(5) means for correcting said fault;

(e) means for updating, upon correction of the fault, the status by said one site of each subtransaction affected by the fault; and (f)(1) means for restarting by said one site the processing of the affected subtransactions at the identified sites, and (f)(2) means for continuing the processing of the unaffected subtransactions.

9. The system of claim 8, wherein the distributed database system is a heterogeneous distributed database system.

10. The system of claim 8, wherein each identified site has stable storage, and means for sending a last executed portion of each subtransaction to stable storage at that site.

11. The system of claim 10, further including means for presenting to a user at the first site an indication that a subtransaction has not been processed due to said fault.

12. The system of claim 8 further including means for retrieving from stable storage previously executed portions of each subtransaction at each site in the distributed database system where the subtransaction was executed.

13. The system of claim 12, further including means for presenting to a user an indication that the transaction has recommenced processing after suspension.

14. The system of claim 8, wherein the means for continuing the processing further comprises:

(a) means for allocating a server at each site for each subtransaction;

(b) means for sending a subtransaction to each identified site;

(c) means for executing a subtransaction to perform an operation by each of the servers;

(d) means for rescheduling selected operations to be performed at selected sites;

(e) means for merging data from each server executing the subtransaction in the distributed database system; and (f) means for presenting merged data to a user at the first site.

* * * * *

UNITED STATES PATENT AND TRADEMARK OFFICE
CERTIFICATE OF CORRECTION

PATENT NO. : 5,247,664
DATED : September 21, 1993
INVENTOR(S) : Glenn R. Thompson, et al It is certified that error appears in the above-indentified patent and that said Letters Patent is hereby corrected as shown below:

Column 9, line 24, "the group including:" should read --the group consisting of:--

Column 9, line 46, "representng" should read --presenting--.

Signed and Sealed this

Twenty-first Day of June, 1994

Attest:

BRUCE LEHMAN

Attesting Officer           Commissioner of Patents and Trademarks